United States Patent [19]

Radermacher

[11] Patent Number: 5,014,408

[45] Date of Patent: May 14, 1991

[54] MACHINE FOR WRAPPING DIVIDER PANELS OR THE LIKE

[76] Inventor: Roger Radermacher, 10321 NE. 201st Place, Bothell, Wash. 98011

[21] Appl. No.: 410,293

[22] Filed: Sep. 21, 1989

[51] Int. Cl.⁵ .............................................. B23P 11/00
[52] U.S. Cl. ................................. 29/243.58; 29/243.5
[58] Field of Search .............. 29/33 K, 243.5, 243.58, 29/779

[56] References Cited

U.S. PATENT DOCUMENTS

| 2,804,101 | 8/1957 | Johnson | 140/109 |
| 3,041,109 | 6/1962 | Eames | 297/449 |
| 3,699,626 | 10/1972 | Roth | 29/200 |
| 3,777,347 | 12/1973 | McCorvey | 29/200 |
| 3,840,960 | 10/1974 | Toti | 29/200 |
| 3,851,684 | 12/1974 | Wyrick | 140/109 |
| 4,147,582 | 4/1979 | Brollo | 156/462 |
| 4,257,150 | 3/1981 | Heffner | 29/33 |
| 4,426,760 | 1/1984 | Watts | 29/407 |
| 4,516,305 | 5/1985 | Unger | 29/448 |

Primary Examiner—Timothy V. Eley
Attorney, Agent, or Firm—Graybeal, Jensen & Puntigam

[57] ABSTRACT

A machine for wrapping divider panels or the like comprising a main frame (20) having a flat work surface (32) and a distributor (34) such that fabric from a roll (30) may be uniformly fed through and distributed by distributor (34) and quickly wrapped around and secured to a panel framework.

2 Claims, 4 Drawing Sheets

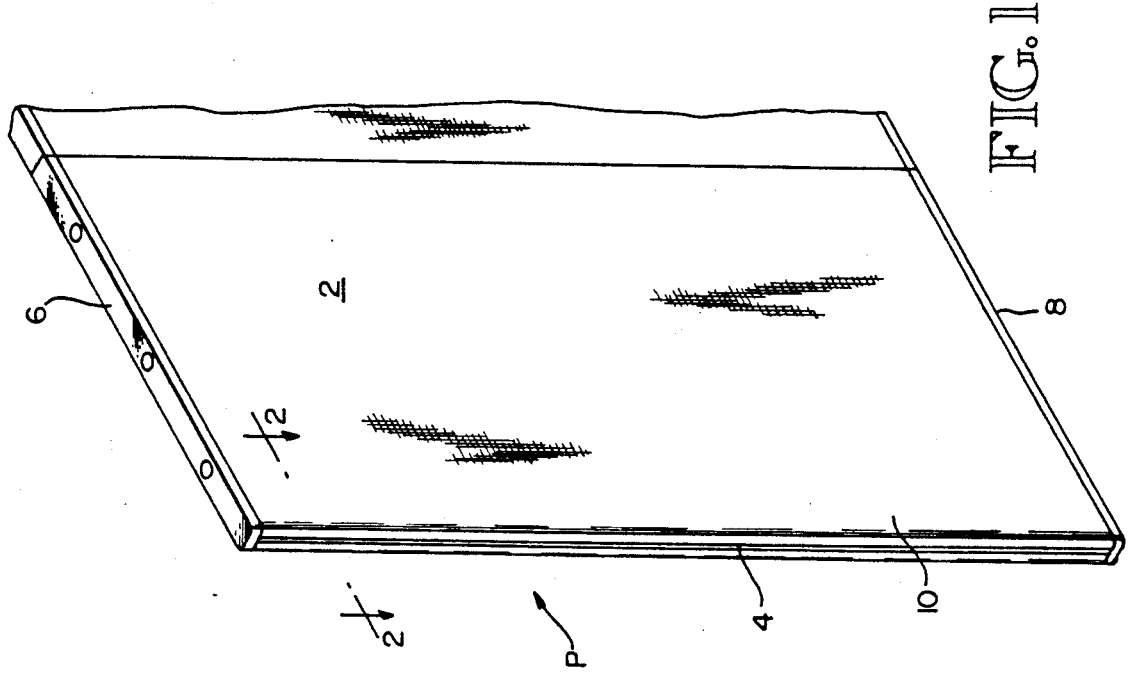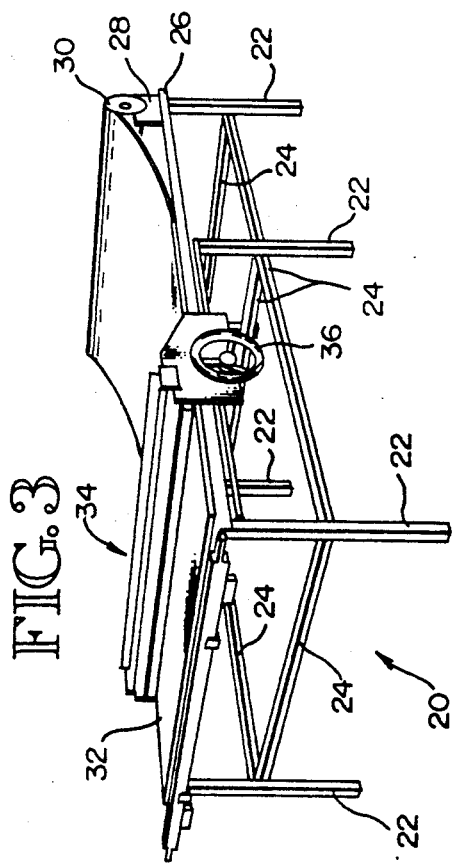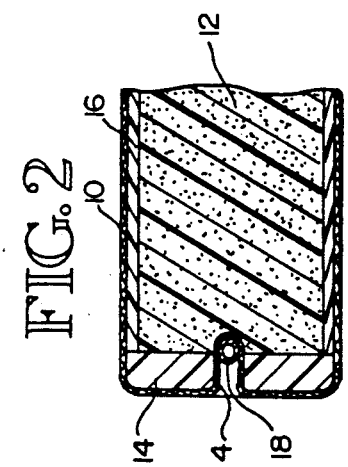

FIG.6
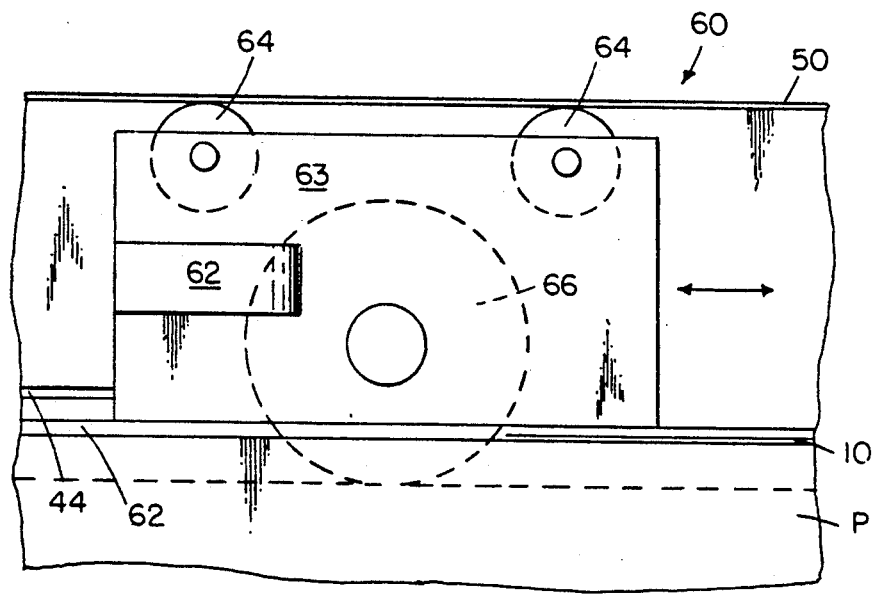
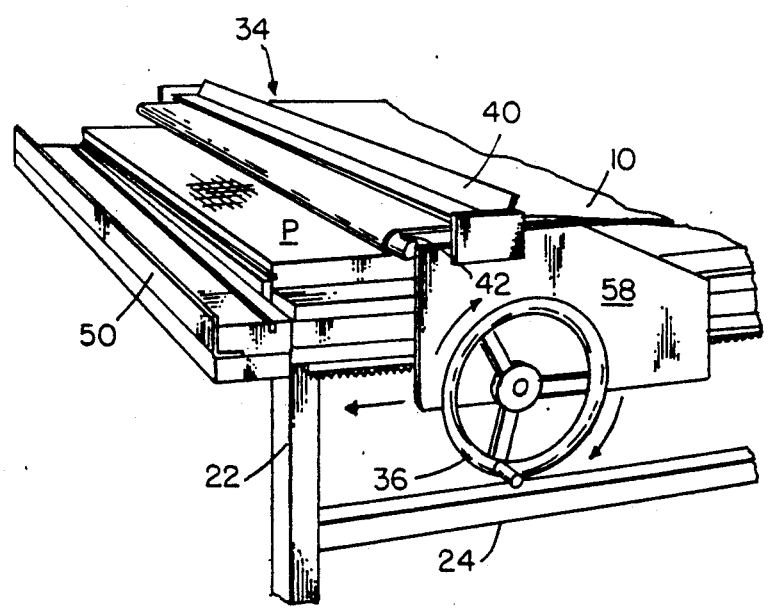
FIG.7

FIG.8
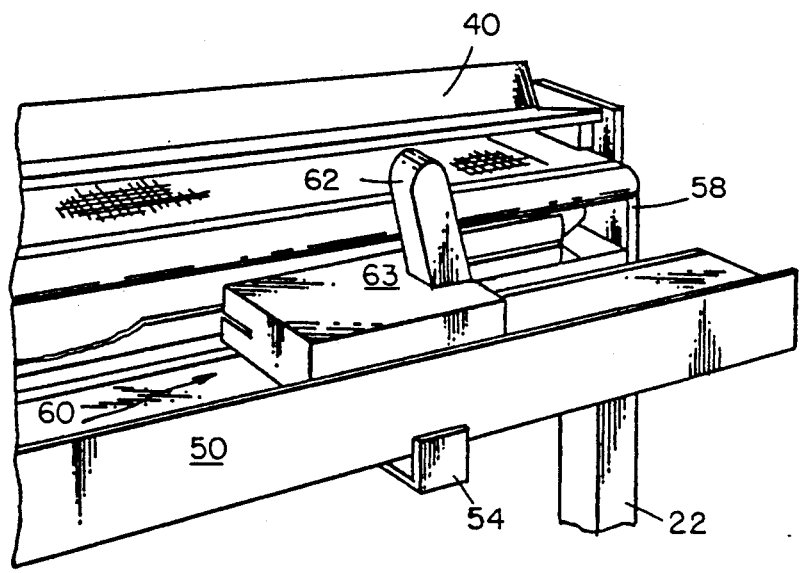
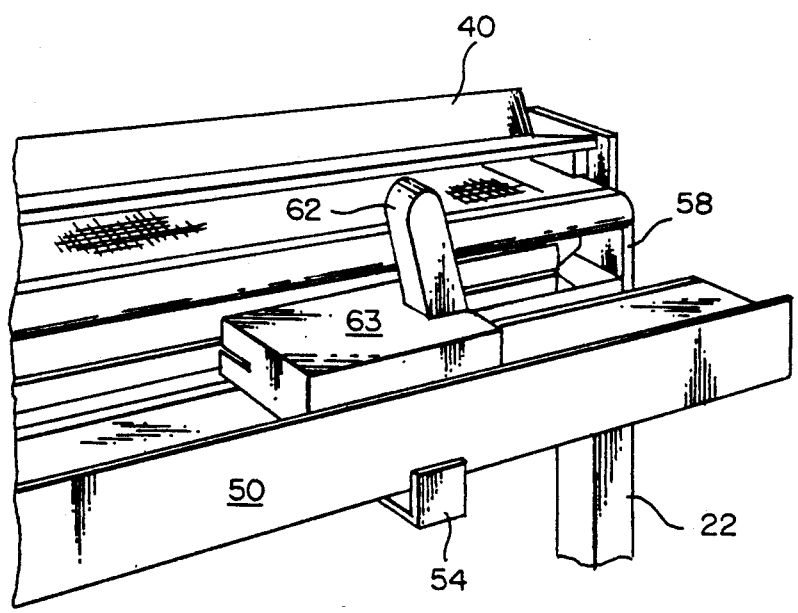
FIG.9

MACHINE FOR WRAPPING DIVIDER PANELS OR THE LIKE

TECHNICAL FIELD

This invention relates to a machine for wrapping divider panels or the like with fabric and more particularly to a machine which allows a single operator to lay a layer of fabric upon a table, place the panel core upon the fabric, wrap the single piece around the edge and over the top of the panel while applying enough tension to assure it to be wrinkle-free, and then allowing it to be inserted into a groove on one edge of the panel and be secured there.

BACKGROUND ART

Historically, panels for dividing office or other space have been wrapped in fabric by premeasuring the fabric, sewing it into a tube with one seam, placing it upon a stretching device and then inserting the panel core inside the tube, removing the stretcher and finishing the ends of the panel. It is imperative to understand that for good appearance the fabric must be in tension. This method required that the panel be perfectly rectangular, i.e. all right angles, the seam be very straight and that the fabric not be stretched beyond its elastic limit.

Examples of devices for placing material under tension such that they may be secured as a skin include:

U.S. Pat. No. 2,342,025 granted to Watter, Feb. 15, 1944, which discloses an apparatus for placing metallic skin under tension and then applying it to the framework of an airplane or the like.

U.S. Pat. No. 2,804,101 granted to Johnson et al., Aug. 27, 1957, discloses an apparatus for tensioning a screening material and then applying it to frames.

U.S. Pat. No. 3,041,109 granted to Eames et al., June 26, 1962, discloses a method for securing a fabric material to a framework by inserting it into a slot and then securing it in place.

U.S. Pat. No. 3,699,626 granted to Roth et al., Oct. 24, 1972, discloses an apparatus for automatically placing a fabric over a framework for a small object such as a brush for removing lint from clothing or the like.

U.S. Pat. No. 3,777,347 granted to McCorbey et al., Dec. 11, 1973, discloses an apparatus which draws two parallel sheets of material such as sheet metal through a dye-forming means and then sprays material into the space between the sheets of metal such that when it is cured it fills the space between the sheets.

U.S. Pat. No. 3,840,960 granted to Toti et al., Oct. 15, 1974, discloses an apparatus for forming hollow metallic beams and the like by simultaneously forming the individual panels and then sealing them along the edges.

U.S. Pat. No. 3,851,684 granted to Wyrach et al., Dec. 3, 1974, discloses an apparatus for assembling flexible sheet material into window screens or the like by securing the material to the frames without rotating the frames.

U.S. Pat. No. 4,147,582 granted to Brollo, Apr. 3, 1979, discloses an apparatus for continuous production of prefabricated insulating panels of sheet metal including a rolling mill and a device for injecting a expandable foam plastic material between the skins.

U.S. Pat. No. 4,257,150 granted to Heffner et al., Mar. 24, 1981, discloses an apparatus including means for providing sheet metal from two separate rolls, a pair of structural assemblies including clamping jaws and means to move the material to a position for fastening.

U.S. Pat. No. 4,426,760 granted to Watts et al., Jan. 24, 1984, discloses a tool for rolling sheet material into a retaining slot.

U.S. Pat. No. 4,516,305 granted to Unger et al., May 14, 1985, discloses a method of/and structure utilized, in securing upholstery fabric to a chair or the like and by utilizing bars under tension to retain the fabric in position.

DISCLOSURE OF THE INVENTION

With the above noted prior art in mind it is an object of the present invention to provide a machine for assisting in the fabrication of divider panels covered with fabric.

It is another object of the present invention to provide a machine enabling the smooth and efficient laying of a fabric material and tensioning said material about a prefabricated framework and then securing the fabric in position.

It is still a further object of the present invention to provide a device for wrapping divider panels in fabric when the fabric to be used is fed directly from a commercially produced roll of fabric.

Yet another object of the present invention is to provide a machine that will distribute fabric from a commercial role and this fabric will be evenly distributed and under uniform tension.

BRIEF DESCRIPTION OF THE DRAWING

FIG. 1 is an isometric view of a divider panel fabricated in accord with the present invention.

FIG. 2 is a partial sectional view of the panel of FIG. 1 showing the fabric in place.

FIG. 3 is an isometric view of the inventive machine for wrapping a divider panel.

FIG. 6 is plan view of the tool for inserting the fabric into the groove.

FIG. 7 is an enlarged view of the front section of the machine showing the placement of the fabric on the second side of the panel.

FIG. 8 depicts the placement of the second edge of the fabric into the provided groove.

FIG. 9 depicts the placement of a compressible bead or securement means within the groove to secure the fabric.

BEST MODE FOR CARRYING OUT THE INVENTION

Figure 4:
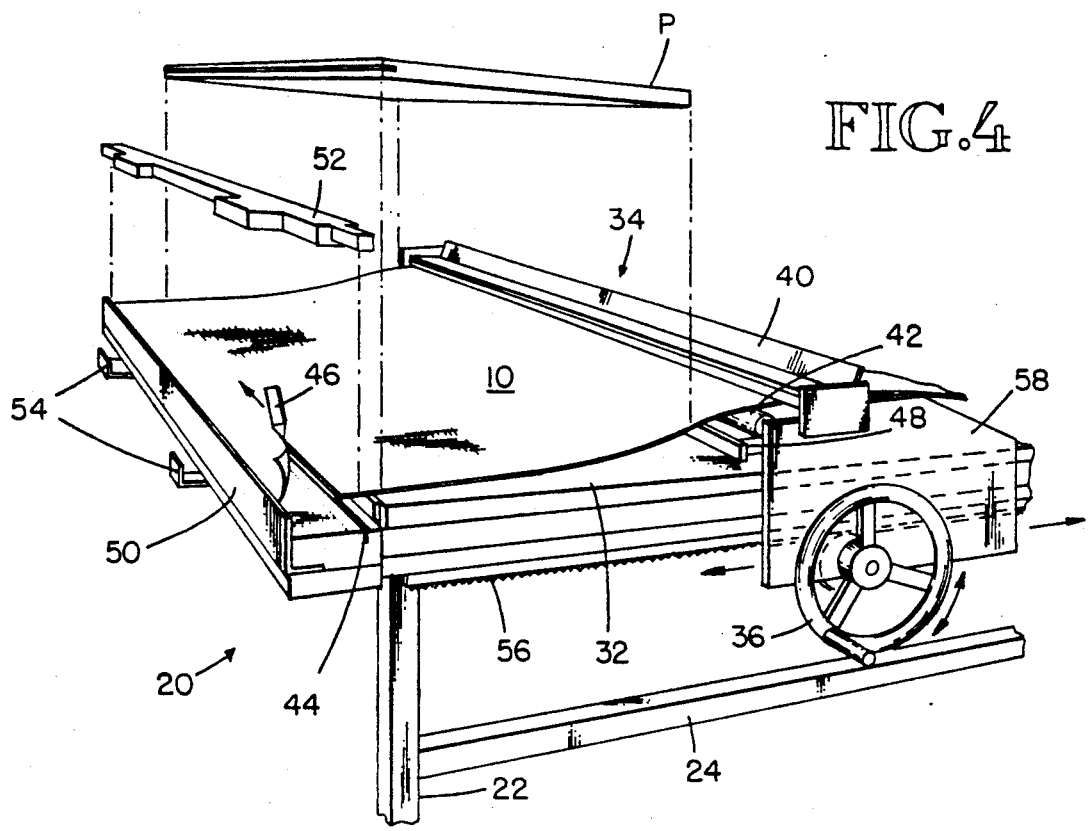
FIG. 4 is an enlarged view of the front portion of the machine of FIG. 3 with this fabric in position.

FIG. 1 shows a panel made in accordance with the present invention, and includes an interior frame, not shown, an edge groove 4 as explained hereinafter, a top molding piece 6 and a bottom molding piece 8. The molding pieces may be of any desired material to enhance the decor. The cloth cover 10 applied in accordance with the present invention obviously may be of any fabric, color or texture desired.

Referring now to FIG. 2 it can be seen that the interior framework of the panel can in fact be of foam plastic 12 which, if rigid, could serve as the structural element. However in the preferred embodiment a framework 14 and a thin skin 16 would provide the base for the fabric 10. Also to be seen this view is the fact that there is a slot or groove 4 along one edge of the framework. The edges of the fabric are forced into the slot 4 and held into position by a bead or line 18 which is preferably slightly larger than the slot 4 into which it is to be inserted and of a compressible material such that when in place it securely holds the fabric edges in position.

Referring to FIG. 3 it can be seen that the inventive device is mounted on a generally rectangular framework having legs 22, intermediate numbers 24 and a rigid top 26. Mounted upon top 26 is a cradle 28 having a plurality of rollers, not shown, to support a roll of fabric 30 such that, as explained hereinafter, the fabric can be pulled to the work-station directly from the roll. Likewise mounted to the upper portion of the table is a flat working surface 32 and a distribution device 34. Distribution device 34 is moveable along the length of the table by controlling wheel 36 which controls the pinion of a rack and pinion as described hereinafter.

Reference is now made to FIG. 4 wherein the work station of the table is shown in a larger scale, and as can be seen the fabric 10 has been pulled outwardly of the roll and through the distribution device 34 beneath guide 40 and above platen 42 toward the front edge of the table 20 and as will be understood from the further description hereinafter the table includes a slot 44 allowing the operator to cut an even edge of the fabric by use of a knife 46. It is to be understood that an electric fabric cutter or shear may also be used. Also seen in this view is an adjustable rear panel stop 48 which defines the back edge of the panel to be wrapped. Rear panel stop 48 will adjust to accommodate different size panels. A fixed forward guide edge 50 cooperates with spacer member 52 to assure that both the fabric and the panel are in position to proceed with the wrapping. Spacer member 52, when not in use, is placed in brackets 54.

Likewise seen in FIG. 4 is a rack 56 which interrelates with a pinion gear, not shown, operated by handle 36 to move the distribution means 34 including side plates 58, guide member 48 and platen 42 across the table. It is to be understood that the far end of the distribution means 34, not shown in detail, likewise includes a rack and pinion combination likewise driven by handle 36, to assure that the distribution means 34 is always operated parallel to the front guide number 50 to assure a smooth transition of the fabric from the roll to the table and eventually to the panel.

Once the fabric has been cut, the spacer 52 is placed in position and then the panel to be wrapped is placed on top of the fabric.

Figure 5:
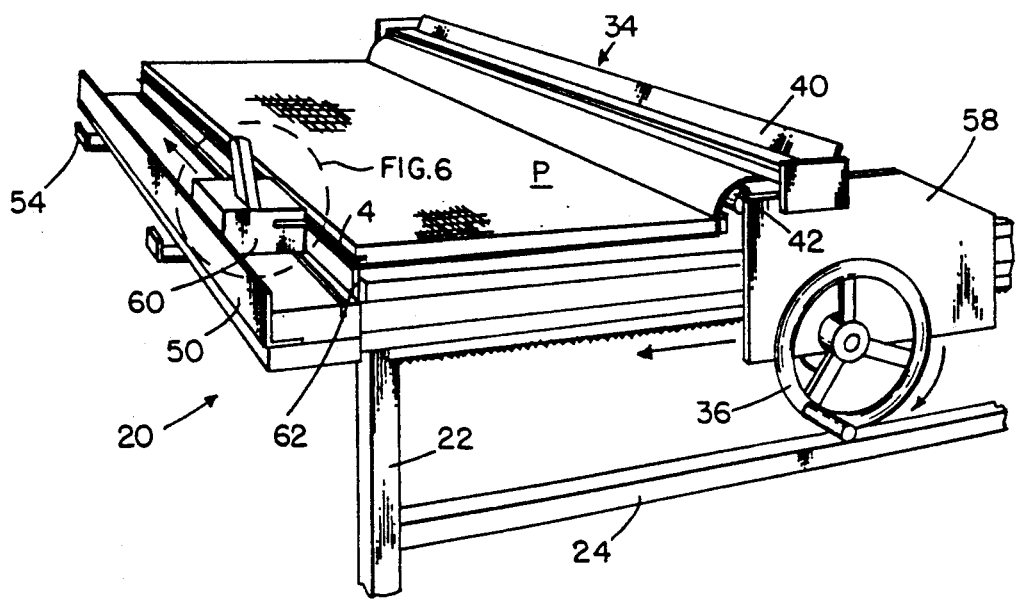
FIG. 5 is another view of the front portion of the machine with a panel frame in place showing the insertion of the first fabric edge into the provided groove.

As seen in FIG. 5 an insert tool 60 is run along the edge of the panel forcing the fabric into the slot 4. Following the placement of the panel P and the removal of the spacer 52 a hydraulic cylinder is actuated elevating holder bar 62 which folds the edge of the fabric up against the edge of the panel allowing the tool 60 to use the guide 50 and force the material into the slot 4.

Reference is now had to FIG. 6 wherein the tool 60 is seen in greater detail and as shown it includes a handle 62, a pair of guide rollers 64 which react against the side of guide 50 and an insert roller 66 which, as shown, rolls above the holder 62 forcing the fabric into the slot 4.

Following the urging of the first fabric edge into slot 4 the distribution means is again moved forward distributing the fabric over the top of the panel as seen in FIG. 7. It is to be noted that the fabric is rolled and kept under the appropriate tension by means of platen 42 around which the fabric is guided.

Following the laying of the fabric over the top of the panel P the fabric is again cut and then, as seen best in FIG. 8, the second edge of the fabric is now forced into the slot 4 by means of the tool 60.

As seen in FIG. 9, a locking strip 18 is pressed into the slot to retain the fabric edges in position. The locking device may be of a material which, although slightly larger than the slot, is capable of being compressed when forced into the slot assuring that the fabric remains in position and that the proper tension is on the fabric to assure an attractive appearance.

Although not at part of this invention the panel is then completed by placing endcaps or the likes on the panel and which also could obviously include feet.

Thus as can be seen the present invention permits a divider panel to be quickly and easily covered in a fabric that assures an attractive appearance thereof.

I claim:

1. A machine for wrapping wall panels including a pair of parallel edges with fabric comprising:
 a main table member having a main support, a roll of fabric at a first end and an operator's station at a second end, distributer means, said distributer means moveable in a first direction along a major portion of the length of the table, straddling the width of the table, said distributer means adapted to move the fabric from the roll to the desired position overlying the table member, and then moveable in a second reverse direction allowing the panel to be placed on top of the fabric and then moved in the first direction placing fabric, under tension, overlying the panel, guide means at the operator's station allowing the fabric to be cut along a straight line, and means at the operator's station to hold the fabric adjacent to the edge of the panel for securement thereto, whereby fabric may be taken directed from a roll and quickly and easily wrapped around a panel and secured in position.

2. A machine as in claim 1 wherein the distributor means is moved by interconnected rack and pinions along each edge at the table.

* * * * *